(12) United States Patent
Coles et al.

(10) Patent No.: US 11,512,612 B2
(45) Date of Patent: Nov. 29, 2022

(54) GEARED TURBOFAN ENGINE MOUNT ARRANGEMENT

(71) Applicant: ROLLS-ROYCE plc, London (GB)

(72) Inventors: David R. Coles, Derby (GB); Gavin M. Rowntree, Derby (GB); Matthew J. Willshee, Nottingham (GB); Zubair Ahmed, Derby (GB)

(73) Assignee: ROLLS-ROYCE plc, London (GB)

( * ) Notice: Subject to any disclaimer, the term of this patent is extended or adjusted under 35 U.S.C. 154(b) by 905 days.

(21) Appl. No.: 16/292,416

(22) Filed: Mar. 5, 2019

(65) Prior Publication Data
US 2019/0300187 A1 Oct. 3, 2019

(30) Foreign Application Priority Data

Mar. 28, 2018 (GB) ..................................... 1804962

(51) Int. Cl.
*F01D 25/28* (2006.01)
*F02C 7/20* (2006.01)
*B64D 27/26* (2006.01)

(52) U.S. Cl.
CPC ................ *F01D 25/28* (2013.01); *F02C 7/20* (2013.01); *B64D 27/26* (2013.01); *B64D 2027/262* (2013.01); *F05D 2240/90* (2013.01)

(58) Field of Classification Search
CPC .......... F01D 25/28; F02C 7/20; B64D 27/26; B64D 2027/262; F05D 2240/90
See application file for complete search history.

(56) References Cited

U.S. PATENT DOCUMENTS

| 4,437,627 A | * | 3/1984 | Moorehead | ............ B64D 33/00 |
| | | | | 60/39.83 |
| 5,427,348 A | * | 6/1995 | Bacon | ....................... F02C 7/20 |
| | | | | 244/54 |

(Continued)

FOREIGN PATENT DOCUMENTS

| EP | 2883795 | 6/2015 |
| FR | 2 925 016 A1 | 6/2009 |

(Continued)

OTHER PUBLICATIONS

Great Britain search report dated Sep. 24, 2018, issued in GP Patent Application No. 1804962.7.

(Continued)

*Primary Examiner* — Gerald L Sung
*Assistant Examiner* — Rene D Ford
(74) *Attorney, Agent, or Firm* — Crowell & Moring LLP (57) ABSTRACT

A gas turbine engine for an aircraft comprising an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, and a front mount and a rear mount, the front and rear mounts being configured to connect the gas turbine engine to the aircraft, wherein the front mount is coupled to a casing of the engine core and the front mount is located at substantially the same axial position as a centre of gravity (CG) of the gas turbine engine or forward of the centre of gravity of the gas turbine engine.

8 Claims, 6 Drawing Sheets

(56) References Cited

U.S. PATENT DOCUMENTS

| | | | |
|---|---|---|---|
| 5,524,847 A * | 6/1996 | Brodell | B64C 7/02 60/797 |
| 8,448,895 B2 | 5/2013 | Suciu et al. | |
| 2005/0194493 A1* | 9/2005 | Marche | B64D 27/26 244/54 |
| 2008/0135679 A1* | 6/2008 | Udall | F01D 25/28 244/54 |
| 2009/0218441 A1* | 9/2009 | Marche | B64D 27/26 244/54 |
| 2012/0168558 A1* | 7/2012 | Journade | B64D 27/18 244/54 |
| 2012/0305700 A1* | 12/2012 | Stuart | B64D 27/18 244/54 |
| 2014/0173881 A1* | 6/2014 | Foster | F16B 19/1045 411/340 |
| 2015/0098810 A1* | 4/2015 | Soria | B64D 29/06 415/200 |
| 2017/0043878 A1 | 2/2017 | Pautis et al. | |
| 2017/0058830 A1* | 3/2017 | Suciu | F01D 9/02 |
| 2017/0197724 A1* | 7/2017 | Pautis | B64D 29/06 |
| 2017/0240288 A1* | 8/2017 | Pautis | B64D 29/06 |

FOREIGN PATENT DOCUMENTS

| | | |
|---|---|---|
| GB | 2275984 | 9/1994 |
| GB | 2548480 | 9/2017 |
| WO | WO 2014/055102 A1 | 4/2014 |
| WO | 2018031548 | 2/2018 |

OTHER PUBLICATIONS

European Search Report, issued in EP Application No. 19 16 1473, dated Aug. 2, 2019, pp. 1-7, European Patent Office, Munich, Germany.

European Office Action dated Nov. 27, 2020, pp. 1-9, issued in European Patent Application No. 19161473.4, European Patent Office, Munich, Germany.

European Office Action dated Sep. 28, 2021, pp. 1-9, issued in European Patent Application No. 19161473.4, European Patent Office, Munich, Germany.

* cited by examiner

GEARED TURBOFAN ENGINE MOUNT ARRANGEMENT

CROSS-REFERENCE TO RELATED APPLICATIONS

This application is based upon and claims the benefits of priority from British Patent Application No. GB1804962.7, filed on 28 Mar. 2018, the entire contents of which are incorporated by reference.

BACKGROUND

Technical Field

The present disclosure relates to a geared turbofan engine with a core mounted front mount for connecting the engine to an aircraft and particularly, although not exclusively, relates to a geared turbofan engine with a front mount provided at the axial location of the centre of gravity of the geared turbofan engine.

Description of the Related Art

Gas turbine engines for an aircraft may be coupled to a wing of the aircraft. The gas turbine engine may be coupled to the aircraft wing by virtue of a pair of mounts at front and rear locations of the gas turbine engine. The front mount for example may connect to a casing surrounding a fan of the gas turbine engine. The rear mount is axially rearward of the front mount.

Gas turbine engines for aircraft typically comprise a propulsive fan that generates two airflows: a core airflow and a bypass airflow. The gas turbine engine comprises a core that receives the core airflow. To improve the efficiency of a gas turbine engine for an aircraft, it is desirable to increase the size of the fan and the bypass air flow. Larger and more efficient fans may be achieved by providing a gear assembly between the core and the fan so as to reduce the speed of the fan.

The vertical distance between the front and rear mounts increases as the fan casing gets larger. This in turn increases a swing angle of the gas turbine engine relative to a horizontal plane. The centre of gravity of the gas turbine engine is also further forward to due to the larger fan and presence of the gear assembly. These factors tend to increase relative movement between the core and the fan casing, which has an adverse effect on the fan blade tip clearances.

SUMMARY

According to a first aspect there is provided a gas turbine engine for an aircraft comprising: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft, and a front mount and a rear mount, the front and rear mounts being configured to connect the gas turbine engine to the aircraft, wherein the front mount is coupled to a casing of the engine core and the front mount is located at substantially the same axial position as a centre of gravity of the gas turbine engine or forward of the centre of gravity of the gas turbine engine.

The front mount may be positioned such that a line passing through the front mount and the centre of gravity of the gas turbine engine may subtend a first angle of 5 degrees or less relative to a plane perpendicular to a longitudinal axis of the gas turbine engine.

The front mount may extend around at least a portion of the engine core casing circumference. The front mount may be coupled to the engine core casing at at least one location about the circumference of the engine core. The front mount may provide at least one coupling point on the engine core casing circumference for connecting the gas turbine engine to the aircraft.

The rear mount may be coupled to the casing of the engine core. The rear mount may extend around at least a portion of the engine core casing circumference. The rear mount may be coupled to the engine core casing at at least one location about the circumference of the engine core. The rear mount may provide at least one coupling point on the engine core casing circumference for connecting the gas turbine engine to the aircraft.

The rear mount and front mount may be positioned such that a line passing through the rear mount and front mount may subtend a second angle of 15 degrees or less relative to a longitudinal axis of the gas turbine engine. In particular, the line passing through the rear mount and front mount may subtend an angle of 10 degrees or less relative to a longitudinal axis of the gas turbine engine.

The gas turbine engine comprises a gearbox that may receive an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The front mount may be provided in the same axial region as the first compressor. The front mount may be provided at a rear end of the first compressor, e.g. axially between the first and second compressors.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Figure 1:
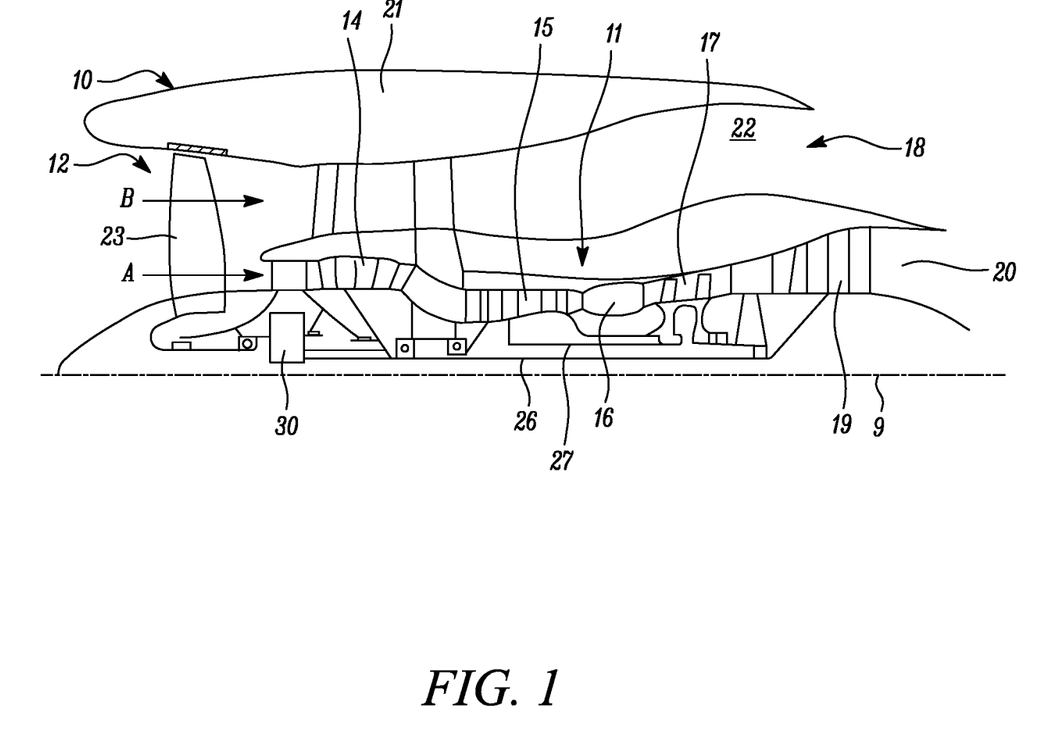
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
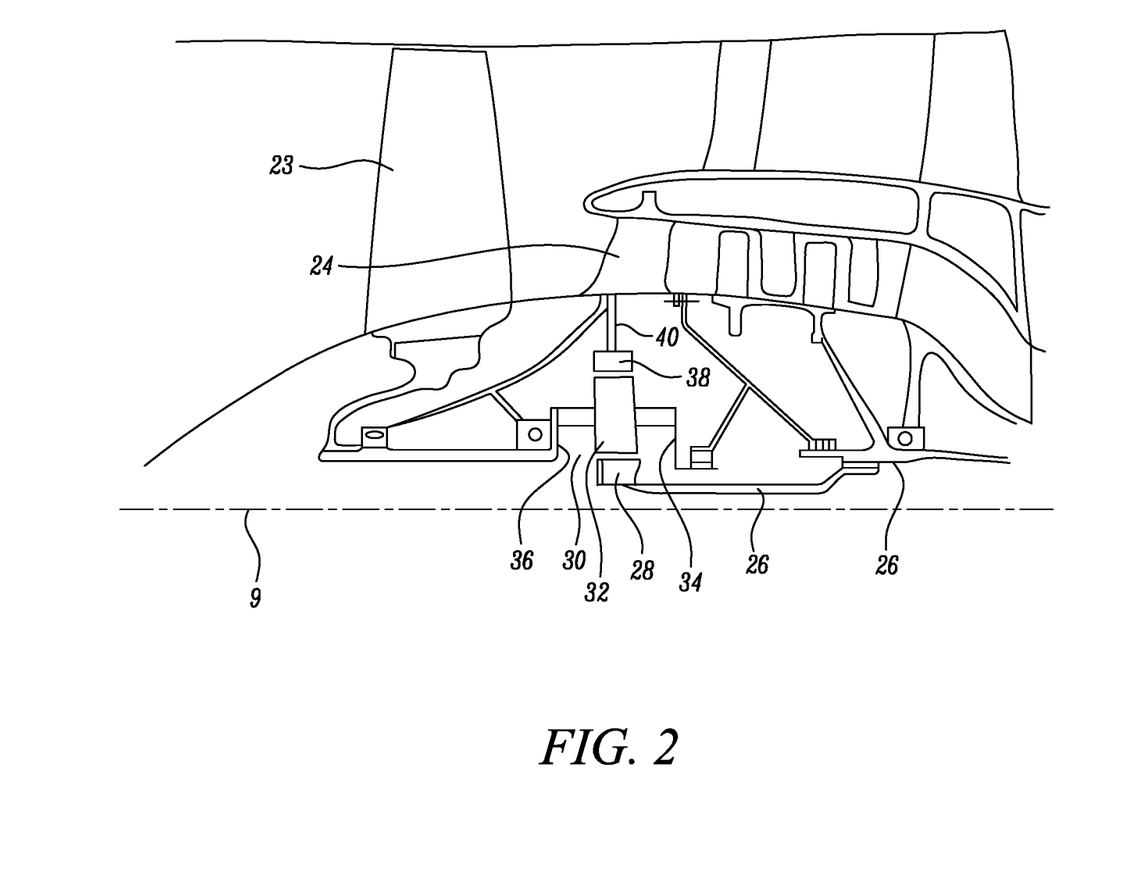
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
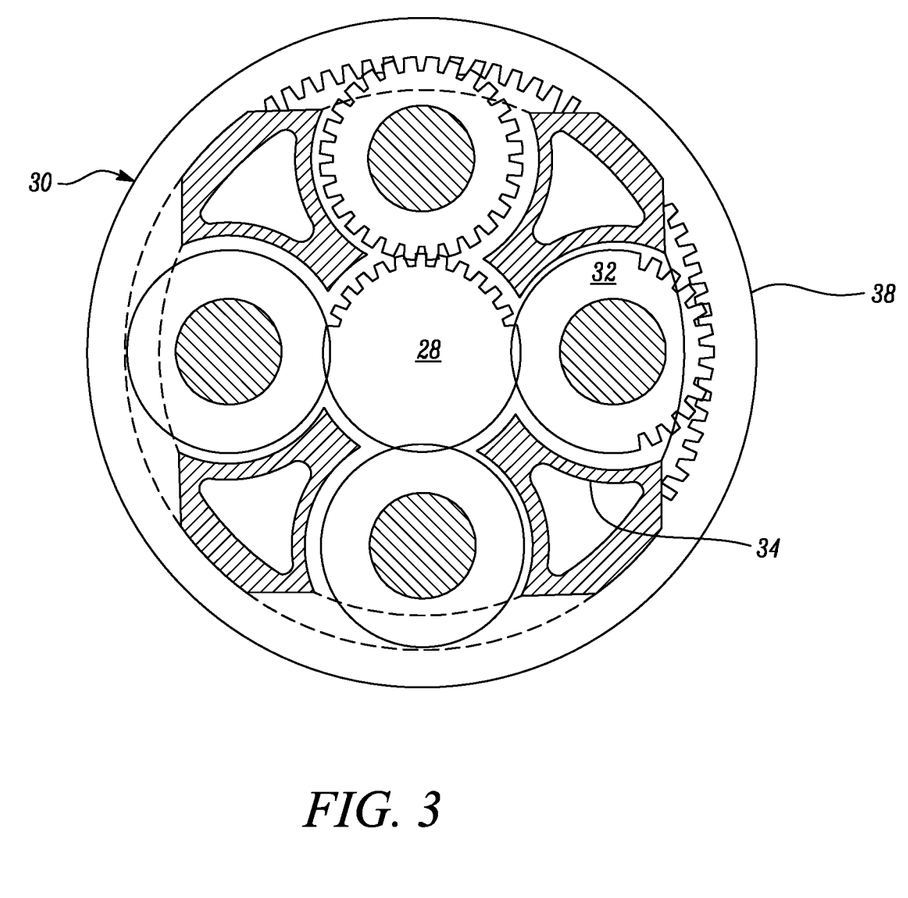
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
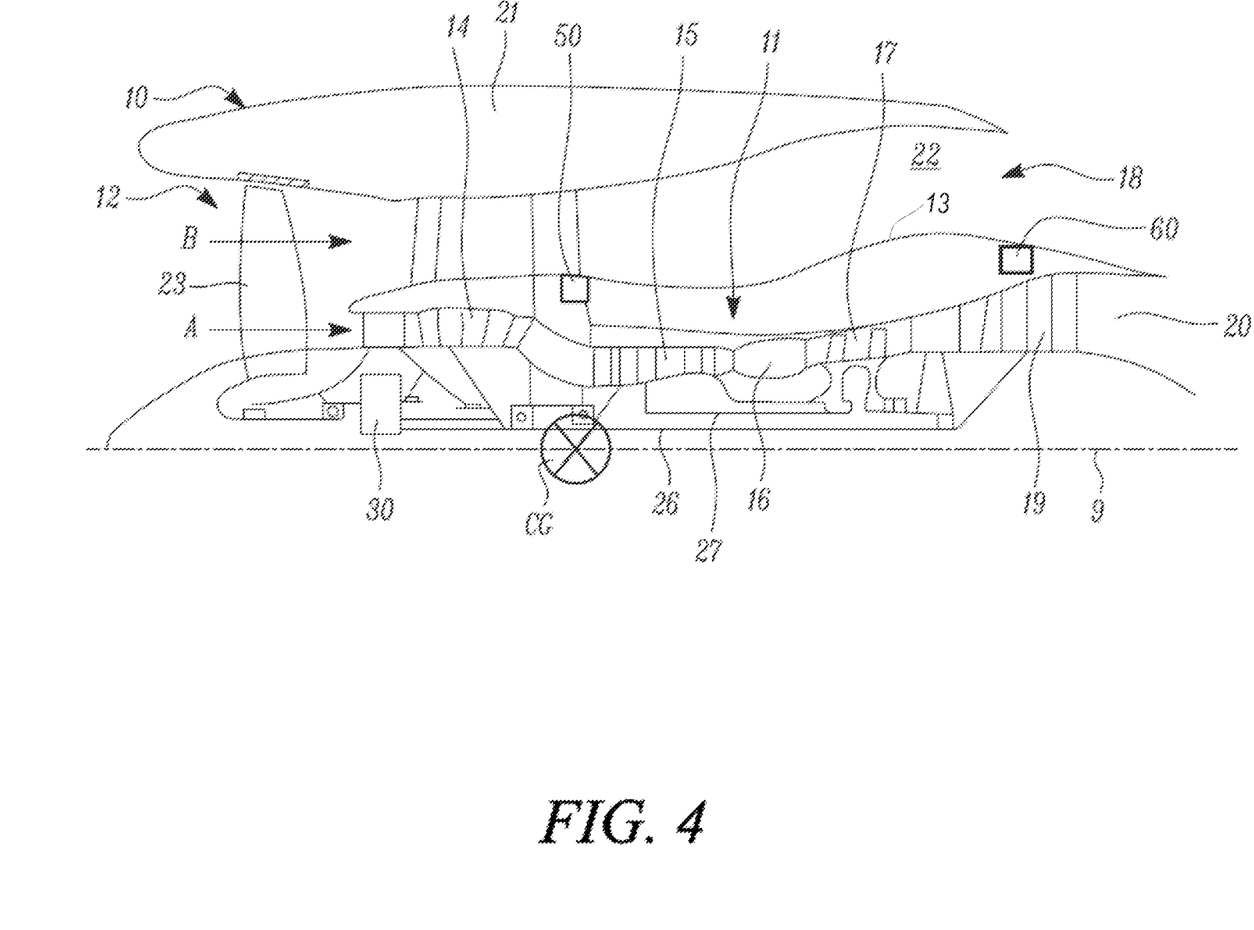
FIG. 4 is a is a schematic sectional side view of a gas turbine engine according to an arrangement of the present disclosure.

Referring now to FIG. 4, the gas turbine engine 10 further comprises a front mount 50 and a rear mount 60, which are depicted in schematic form. The front and rear mounts 50, 60 are configured to connect the gas turbine engine 10 to an aircraft (not shown). For example, the front and rear mounts 50, 60 may connect the gas turbine engine 10 to a wing of the aircraft, in particular the underside of a wing. Structural members (not depicted) may extend from the front and rear mounts 50, 60 towards the aircraft and may be coupled to the aircraft at the appropriate point.

The front mount 50 is coupled to a casing 13 of the engine core 11. The casing 13 surrounds the compressor 14 and separates the core airflow A and the bypass airflow B. The front mount 50 may extend around at least a portion of the engine core circumference.

Figure 5:
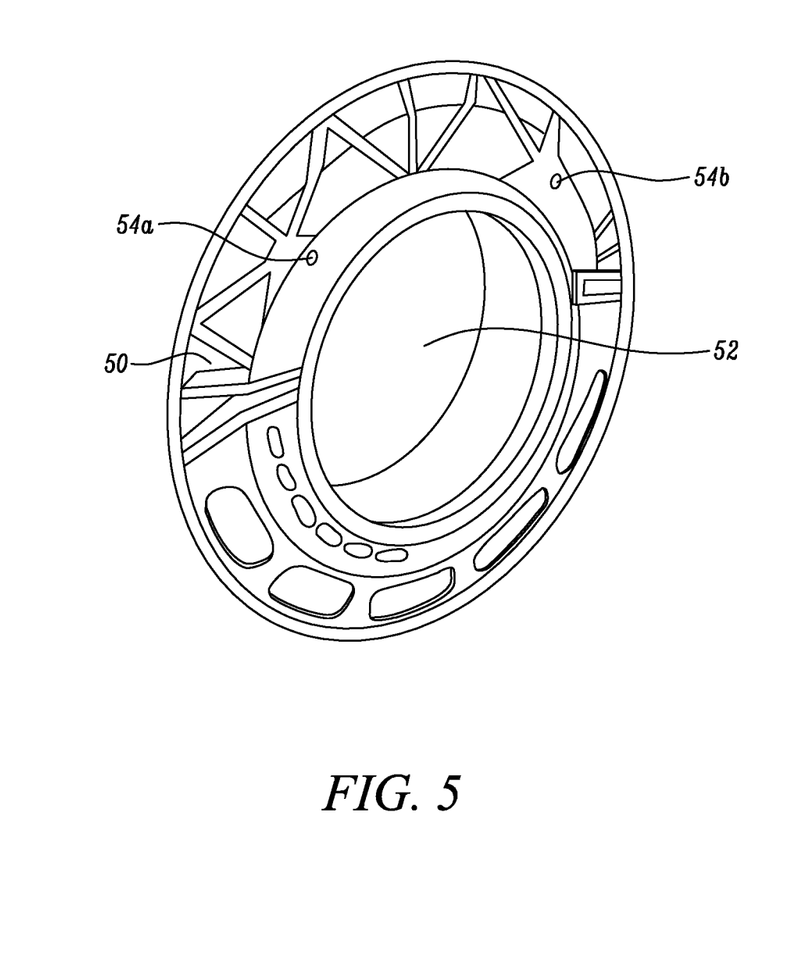
FIG. 5 is a perspective view of a front core mount according to an arrangement of the present disclosure.

FIG. 5 depicts an exemplary front mount 50. The front mount 50 extends circumferentially about the engine core 11. The core airflow A passes through a radial centre 52 of the front mount and the bypass airflow B passes radially outside the front mount. The front mount 50 may also provide one or more coupling points 54a, 54b at various points on the circumference of the engine core casing 13. In the example shown there are two coupling points 54a, 54b. The structural members that connect to the aircraft may connect to the front mount coupling points 54a, 54b.

By way of example, the front mount 50 may be provided in the same axial region as the low pressure compressor 14. In particular, the front mount 50 may be provided at a rear end of the low pressure compressor 14, e.g. axially between the low and high compressors 14, 15.

The rear mount 60 may also be coupled to the engine core casing 13. The rear mount 60 may extend around at least a portion of the engine core circumference. The rear mount 60 may also provide one or more coupling points at various points on the circumference of the engine core casing 13. The structural members may connect to the rear mount coupling points.

Figure 6:
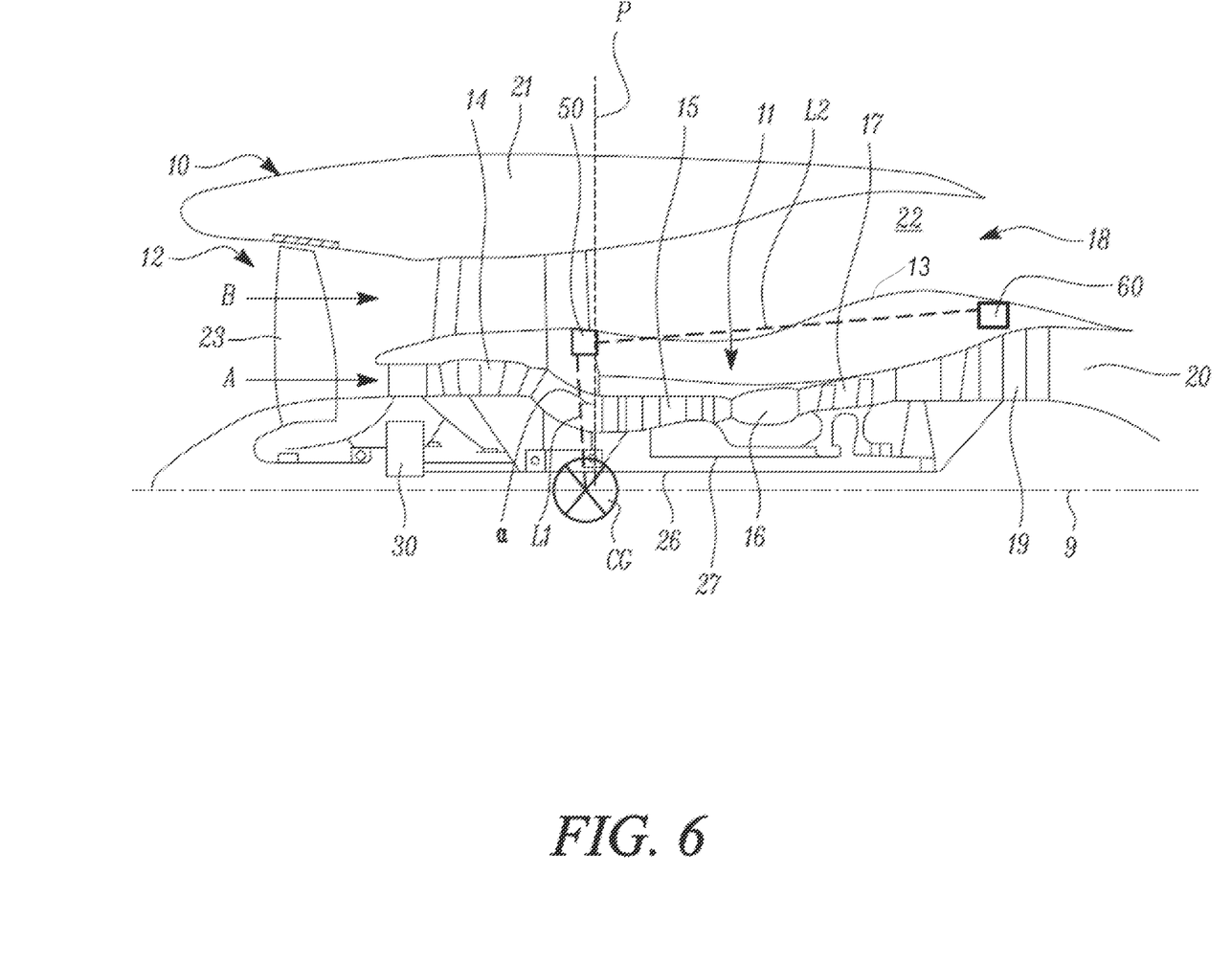
FIG. 6 is a further schematic sectional side view of a gas turbine engine according to an arrangement of the present disclosure.

As depicted in FIG. 6, the front mount 50 is located at substantially the same axial position as a centre of gravity CG of the gas turbine engine 10. In particular, the front mount 50 may be positioned such that a line L1 passing through the front mount 50 and the centre of gravity CG of the gas turbine engine may subtend a first angle α of 5 degrees or less relative to a plane P perpendicular to the longitudinal axis 9 of the gas turbine engine. However, it is also envisaged that the front mount 50 may be located at any other axial position that is forward of the centre of gravity CG of the gas turbine engine 10.

With a geared turbofan engine, the centre of gravity CG is further forward due to the presence of the gearbox 30 and the larger fan 23. Having the front mount 50 substantially at or forward of the engine centre of gravity CG helps to stabilise the connection to the aircraft and reduces the tendency for the gas turbine engine 10 to swing or twist relative to the aircraft. Relative movement between the core 11 and nacelle 21 is thus reduced and better control of the fan tip clearances is obtained. Having the front mount 50 substantially at or forward of the engine centre of gravity CG also allows the size and/or strength of the rear mount 60 to be reduced.

Referring still to FIG. 6, the rear mount 60 and front mount 50 may be positioned such that a line L2 passing through the rear mount 60 and front mount 50 may subtend a second angle β of 15 degrees or less relative to the longitudinal axis 9 of the gas turbine engine. In particular, the line L2 may subtend a second angle β of 10 degrees or less relative to the longitudinal axis 9. The second angle β may be referred to as a swing angle of the gas turbine engine. The arrangement of the front mount 50 reduces the swing angle, which in turn reduces relative movement between the core 11 and nacelle 21.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
an engine core comprising a turbine, a compressor, and a core shaft connecting the turbine to the compressor;
a fan located upstream of the engine core, the fan comprising a plurality of fan blades;
a gearbox that receives an input from the core shaft and outputs drive to the fan so as to drive the fan at a lower rotational speed than the core shaft, and
a front mount and a rear mount, the front and rear mounts being configured to connect the gas turbine engine to the aircraft,
wherein the front mount is coupled to a casing of the engine core and the front mount is located at forward of the centre of gravity of the gas turbine engine,
wherein the front mount is positioned such that a line (L1) passing through the front mount and the centre of gravity (CG) of the gas turbine engine subtends a first angle (α) of 5 degrees or less relative to a plane (P) perpendicular to a longitudinal axis of the gas turbine engine,
wherein the rear mount is coupled to the casing of the engine core.

2. The gas turbine engine according to claim 1, wherein the front mount extends around at least a portion of the engine core casing circumference.

3. The gas turbine engine according to claim 1, wherein the front mount provides at least one coupling point on the engine core casing circumference for connecting the gas turbine engine to the aircraft.

4. The gas turbine engine according to claim 1, wherein the fan has a diameter greater than or equal to 250 cm.

5. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

6. The gas turbine engine according to claim 1, wherein the front mount is provided in an axial region that overlaps the first compressor.

7. The gas turbine engine according to claim 6, wherein the front mount is provided at a rear end of the first compressor.

8. The gas turbine engine according to claim 1, wherein the rear mount and front mount are positioned such that a line (L2) passing through the rear mount and front mount subtends a second angle ($\beta$) of 15 degrees or less relative to the longitudinal axis of the gas turbine engine.

* * * * *